(12) United States Patent
Goumain et al.

(10) Patent No.: US 9,722,527 B2
(45) Date of Patent: Aug. 1, 2017

(54) POWER SUPPLY OF AN ELECTRIC MOTOR

(71) Applicant: Valeo Systemes Thermiques, Le Mesnil Saint Denis (FR)

(72) Inventors: Xavier Goumain, Montigny-le-Bretonneux (FR); Xavier Rousseil, Vanves (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/038,210

(22) PCT Filed: Nov. 18, 2014

(86) PCT No.: PCT/EP2014/074946
§ 371 (c)(1),
(2) Date: May 20, 2016

(87) PCT Pub. No.: WO2015/075039
PCT Pub. Date: May 28, 2015

(65) Prior Publication Data
US 2016/0294315 A1 Oct. 6, 2016

(30) Foreign Application Priority Data
Nov. 20, 2013 (FR) ...................................... 13 61377

(51) Int. Cl.
*H02P 27/00* (2006.01)
*H02P 27/04* (2016.01)
(Continued)

(52) U.S. Cl.
CPC .............. *H02P 27/047* (2013.01); *H02P 6/08* (2013.01); *H02P 6/20* (2013.01); *H02P 21/34* (2016.02)

(58) Field of Classification Search
CPC .... H02P 21/34; H02P 6/08; H02P 1/46; H02P 6/20; H02P 27/08; H02P 7/2913
See application file for complete search history.

(56) References Cited

U.S. PATENT DOCUMENTS

2015/0207447 A1* 7/2015 Sato .......................... H02P 1/46
318/400.11

FOREIGN PATENT DOCUMENTS

EP 0282598 A1 9/1988
GB 2047444 A 11/1980
(Continued)

OTHER PUBLICATIONS

International Search Report issued in corresponding application No. PCT/EP2014/074946 mailed Oct. 13, 2015 (6 pages).
(Continued)

*Primary Examiner* — Karen Masih
(74) *Attorney, Agent, or Firm* — Osha Liang LLP

(57) ABSTRACT

The invention relates to a power supply system of an electric motor (1) comprising a power circuit (3), the input terminals of which are connected to a DC voltage source, and an electronic circuit (4) for controlling the electric motor (1) based on a control signal representative of the set speed of the motor. According to the invention, the system comprises a means (6) capable of reducing the DC voltage value received by the power circuit (3) during the starting of the electric motor (1) and/or during operating phases in which the set speed of the electric motor (1) is below a threshold speed.

7 Claims, 2 Drawing Sheets

(51) Int. Cl.
*H02P 6/20* (2016.01)
*H02P 21/34* (2016.01)
*H02P 6/08* (2016.01)

(56) References Cited

FOREIGN PATENT DOCUMENTS

| WO | 88/01111 A1 | 2/1988 |
|----|-------------|--------|
| WO | 0203538 A1  | 1/2002 |

OTHER PUBLICATIONS

Written Opinion of the International Searching Authority issued in corresponding application No. PCT/EP2014/074946 dated Oct. 13, 2015 (7 pages).

\* cited by examiner

POWER SUPPLY OF AN ELECTRIC MOTOR

The present invention relates to the powering of electric motors. A particularly interesting application of the invention lies within the area of powering of electric motors used in motor vehicles.

Generally a power supply system of an electric motor used in a motor vehicle comprises a power circuit intended to transmit the voltage of the vehicle battery to an electronic board managing the power supply of said motor. An example of such a power supply system is schematically shown in FIG. 1 for the power supply of a three-phase electronic switching motor 1 designed to drive a fan 2 of a heating, ventilation and air-conditioning system of a motor vehicle. Such a motor 1, also known as a "brushless motor" or self-controlled synchronous motor of the magnet type, comprises three stator windings, shown here in a triangular arrangement, the voltages U, V and W of which are supplied by the power supply system. This power supply system comprises:

a power circuit 3, the input terminals of which are connected to a voltage source (not shown) formed by the vehicle battery, and an electronic control circuit 4 intended to power the motor 1.

The power circuit 3 is an input filter comprising, for example, an inductance L connected in series to the positive terminal +BAT of the battery, two capacitors each mounted between the negative terminal −BAT and one of the terminals of the inductance. Its function is to transmit the voltage of the battery to the electronic control circuit 4. The electronic control circuit 4 is composed of a chopper power supply circuit comprising three bridge arms 9, 10, 11 each comprising two switches mounted in series, each switch being provided with an antiparallel diode. Each of the three stator windings of the motor 1 is therefore supplied by one of the bridges. In order to avoid a permanent connection of the battery to the power circuit and to the electronic control circuit which could give rise to stray currents likely to cause undesirable heating, the power supply system also comprises a safety switch 5 allowing the battery to be selectively connected to the power circuit 3 and to the electronic control circuit 4. In the example shown, this safety switch 5 is arranged in series with the connection terminal −BATT, but could in an equivalent manner be connected in series with the terminal +BATT. The safety switch 5 is conventionally an enhancement MOSFET transistor, for example of the N type, the drain and source of which are connected in series to the connection terminal −BATT and the gate of which receives a control signal SW_CMD allowing the transistor to be flipped between a disabled state (switch open) or saturated operation state (switch closed) where the transistor acts between its drain and its source in the manner of a very low value resistance.

One of the problems which is posed with this type of electric motor is the acoustic noise emission level which may be not insignificant in relation to the surrounding sound emissions. In particular, the studies carried out by the Applicant have shown that the noise generated by these motors could be considerable during certain operating phases, in particular during the motor starting phases, or also when the motor is controlled so as to run at relatively low speeds.

In this context, the present invention aims to provide a solution which is able to improve the sound performance, in particular reduce the sound emission level, of an electric motor depending on the operating phase of the motor.

To this end, the invention proposes a power supply system for an electric motor, comprising:

a power circuit, the input terminals of which are connected to a DC voltage source;

an electronic circuit controlling the electric motor depending on a control signal representing the set speed of the motor, said system being characterized in that it is able to reduce the value of the DC voltage received by the power circuit during starting of the electric motor and/or during the operating phases where the set speed of the electric motor is less than a threshold value.

Owing to the invention, the fact of reducing the power supply voltage during well-defined operating phases of the motor where the set speed is low is able to ensure a significant reduction in the sound emissions due to the stator windings.

The system according to the invention may also have one or more of the characteristic features below, considered singly or in all the technically possible combinations:

the value of the DC voltage received by the power circuit corresponds, during starting of the electric motor and/or during the operating phases where the set speed of the electric motor is less than a threshold speed, to the DC voltage supplied by the source reduced by a value increasing linearly as a function of the set speed;

the power supply system comprises moreover a MOSFET transistor forming a safety switch which, in the closed position, allows connection of the power circuit to said DC voltage source, and a means for controlling the gate of the MOSFET transistor able to set said transistor in the closed position in a saturated operation mode for a set speed higher than said threshold speed, or in the closed position in a linear operation mode for a set speed less than said threshold speed;

in said linear operation mode, the MOSFET transistor is controlled to produce between the drain and the source a voltage increasing linearly as a function of the set speed;

the threshold speed is comprised between 10% and 30% of the maximum possible speed of the electric motor;

the threshold speed is preferably equal to 20% of the maximum possible speed of the electric motor;

the electric motor is of the brushless type or type with brushes;

the electric motor is preferably of the brushless type.

Further characteristic features and advantages of the invention will emerge clearly from the description thereof which is provided below, by way of a non-limiting example, with reference to the attached figures in which.

Figure 1:
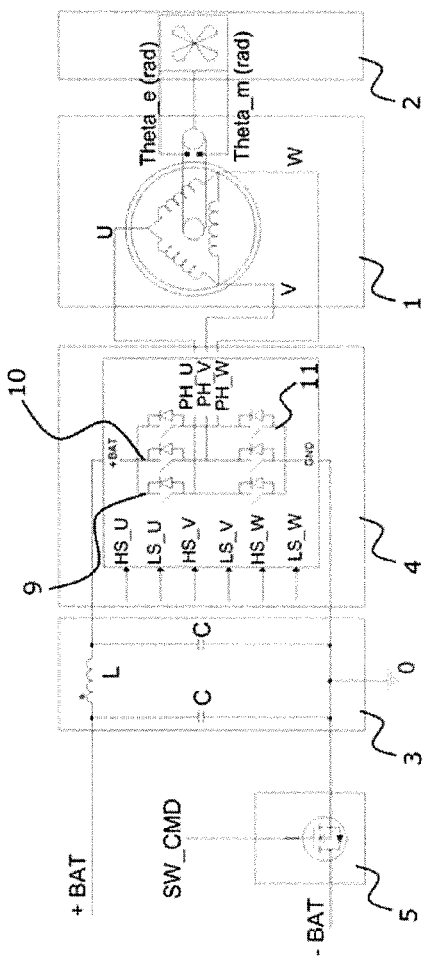
FIG. 1 is a simplified schematic representation of a power supply system of an electric motor according to the prior art.
Figure 2:
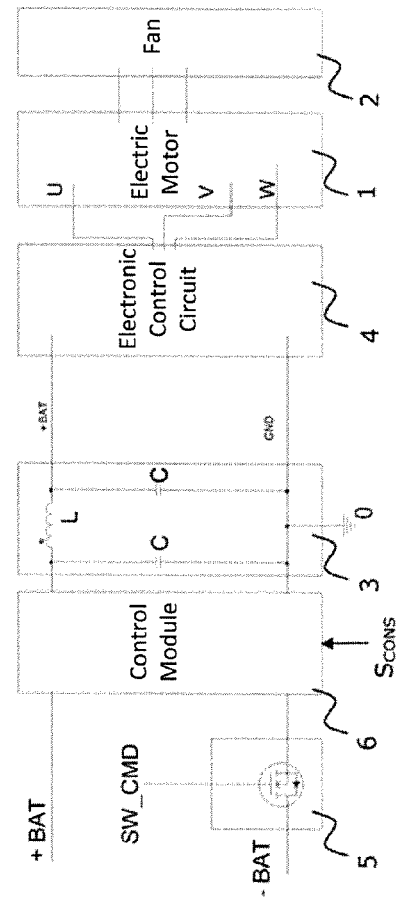
FIG. 2 is a simplified schematic representation of a power supply system of an electric motor according to a possible embodiment of the invention.

FIG. 1 was described further above with reference to the prior art. FIG. 2 is a simplified diagrammatic representation of a power supply system of an electric motor 1 according to the invention.

This comprises, as explained above within the context of the prior art:

a power circuit 3, the input terminals of which are connected to a voltage source (not shown) formed by the vehicle battery, and an electronic control circuit 4 intended to power the motor 1 depending on a control signal representing the set speed of the motor, and preferably, a safety switch 5 allowing the battery to be connected selectively to the power circuit 3 and to the electronic control circuit 4.

As mentioned further above, during conventional operation, namely when the safety switch 5 is closed, the power circuit 3, and consequently, the electronic control circuit 4, are powered by the value of the voltage as supplied by the vehicle battery, typically in the region of 13 volts.

The tests carried out by the Applicant have been able to show that the sound emissions, in particular those associated with the stator windings in the case of a brushless motor, are proportional to the value of the DC power supply voltage.

Based on this finding, it is proposed to provide the power supply system with a control module 6 such that the system is able to reduce the value of the DC voltage received by the power circuit during the operating phases of the motor where the sound emissions are the loudest, typically during starting of the electric motor and/or during the operating phases where the set speed of the electric motor is less than a threshold speed.

The role of the control module 6, which is represented here schematically in the form of an electronic circuit arranged between the safety switch 5 and the input of the power circuit 3 is therefore that of:

allowing the power circuit 3 to be powered by the DC voltage output by the battery when the set speed for the motor is greater than the threshold speed and reducing otherwise the DC voltage value, preferably by a value increasing linearly as a function of the set speed.

A large number of electronic or software operations may be implemented in order to ensure such a control of the power supply voltage value.

Figure 3:
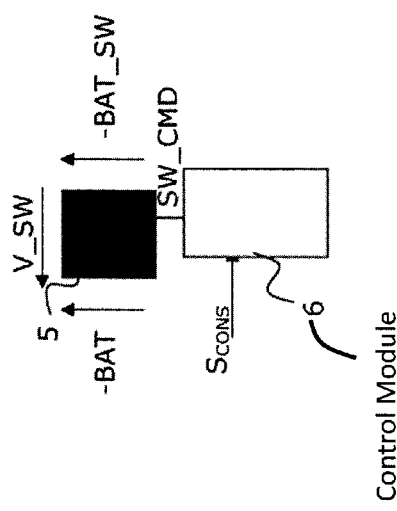
FIG. 3 shows in schematic form a preferred mode of implementation allowing a reduction in the value of the DC voltage value received by the power circuit in FIG. 1.

FIG. 3 shows a particularly ingenious implementation arrangement where the best possible use is made of the components already available in the system, in particular the MOSFET transistor 5 used as safety switch for interrupting the power supply in the event of overheating, or for putting the system on standby.

In accordance with the embodiment of the invention, the way in which the transistor gate is controlled is modified so that it is not used as a simple switch. More specifically, the transistor which hitherto was used only in saturated mode, whatever the set speed, will now be driven depending on the set speed so as to:

operate in a conventional saturated condition when the set speeds are higher than the threshold value;

operate otherwise in a linear manner otherwise, so as to reduce the value of the voltage actually supplied to the circuit 3 by a value increasing linearly as a function of the set speed.

Figure 4:
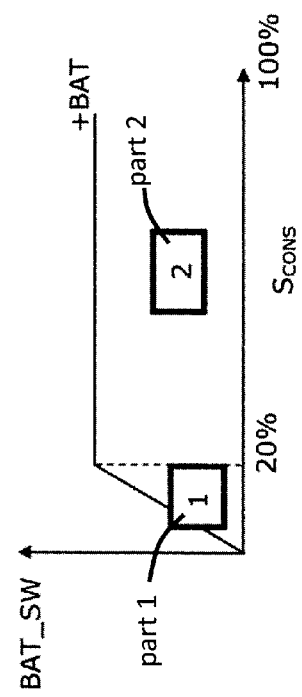
FIG. 4 shows, by way of example, the power supply voltage supplied as a function of the operating phases of the electric motor.

This principle is illustrated in FIGS. 3 and 4. When the transistor 5 is in a saturated operation zone, the circuit downstream of the transistor receives in a conventional manner the power supply +BAT output by the battery. This zone corresponds to the part 2 in FIG. 4.

On the other hand, when the transistor 5 is in its linear operation zone, it generates a non-zero voltage V_SW between its drain and its source, so that the downstream circuit receives the voltage:

+BAT−$V\_SW$

The part 1 in FIG. 4 shows the variations in voltage received by the circuit 3 as a function of the set speed of the motor. In the example shown, the threshold speed is in the region of 20% of the maximum speed possible for the electric motor.

The control signal SW_CMD is generated by the module 6 depending on the set speed $S_{CONS}$.

The control module 6 may be entirely software-based, being managed for example by a microcontroller able to generate, for linear operation, a Pulse Width Modulation (PWM) signal which is proportional to the set speed.

By way of a variant, a specific electronic circuit able to generate a command proportional to the set speed may also be used.

In both cases a feedback loop may be added for regulation purposes.

What is claimed is:

1. A power supply system for an electric motor comprising:
   a power circuit, the input terminals of which are connected to a DC voltage source;
   an electronic circuit for controlling the electric motor depending on a control signal representing a set speed of the motor;
   a MOSFET transistor forming a safety switch which, in a closed position, allows connection of the power circuit to said DC voltage source; and
   a controller that controls a gate of the MOSFET transistor able to set said transistor in the closed position in a saturated operation mode for a set speed higher than said threshold speed, or in a closed position in a linear operation mode for a set speed less than a threshold speed,
   wherein the MOSFET transistor is able to reduce the value of the DC voltage received by the power circuit during starting of the electric motor and/or during the operating phases where the set speed of the electric motor is less than the threshold speed.

2. The power supply system as claimed in claim 1, wherein said value of the DC voltage received by the power circuit corresponds, during starting of the electric motor and/or during the operating phases where the set speed of the electric motor is less than a threshold speed, to the DC voltage supplied by the source reduced by a value increasing linearly as a function of the set speed.

3. The power supply system as claimed in claim 1, wherein, in said linear operation mode, the MOSFET transistor is controlled so as to produce, between the drain and the source, a voltage increasing linearly as a function of the set speed.

4. The power supply system as claimed in claim 1, wherein said control means comprises a microcontroller designed to generate a Pulse Width Modulation (PWM) signal proportional to the set speed.

5. The power supply system as claimed in claim 1, wherein said control means comprises an electronic circuit.

6. The power supply as claimed in claim 1, wherein said electronic circuit is formed by a chopper power supply circuit.

7. The power supply system as claimed in claim 1, designed to power a brushless electric motor, wherein the threshold speed is equal to 20% of the maximum possible speed of the electric motor.

* * * * *